United States Patent [19]

Hiruma

[11] Patent Number: 4,847,454
[45] Date of Patent: Jul. 11, 1989

[54] SWITCH DEVICE FOR MOTORCYCLE OR THE LIKE

[75] Inventor: Tadao Hiruma, Tokyo, Japan

[73] Assignee: Honda Giken Kogyo Kabushiki Kaisha, Tokyo, Japan

[21] Appl. No.: 143,813

[22] Filed: Jan. 13, 1988

[30] Foreign Application Priority Data

Jan. 14, 1987 [JP] Japan ............... 62-4232[U]

[51] Int. Cl.⁴ ............................................. H01H 9/06
[52] U.S. Cl. .................................. 200/61.85; 200/293.1
[58] Field of Search .................. 200/61.85, 157, 293.1, 200/553; 74/551.8

[56] References Cited

U.S. PATENT DOCUMENTS

| | | | |
|---|---|---|---|
| 3,906,369 | 9/1975 | Pitman et al. | 200/157 X |
| 4,455,463 | 6/1984 | Röhl | 200/61.85 |
| 4,508,944 | 4/1985 | Yashima et al. | 200/61.85 |
| 4,565,909 | 1/1986 | Yashima et al. | 200/61.85 |
| 4,710,599 | 12/1987 | Motodale et al. | 200/61.85 |

Primary Examiner—J. R. Scott
Attorney, Agent, or Firm—James E. Cockfield

[57] ABSTRACT

A switch device for a motorcycle or the like having a handle grip fitted to one end of a handle bar, a swtich case arranged on a inside portion of an end of the handle grip, and a switch knob element mounted on a mounting surface of the switch case. This conbination is characterized in that the switch device comprises support elements operable to position the switch knob element with a center line thereof being inclined relative to a line extending perpendicular to a longitudinal axis of the handle bar. Further, the switch knob element includes multiple operating locations operable to effect deverse operating conditions in response to depression by an operator's hand digit tip, with these multiple operating locations being disposed generally along an arcuate path traversed by the operator's hand digit tip while the operator is hand-gripping the handle grip.

5 Claims, 3 Drawing Sheets

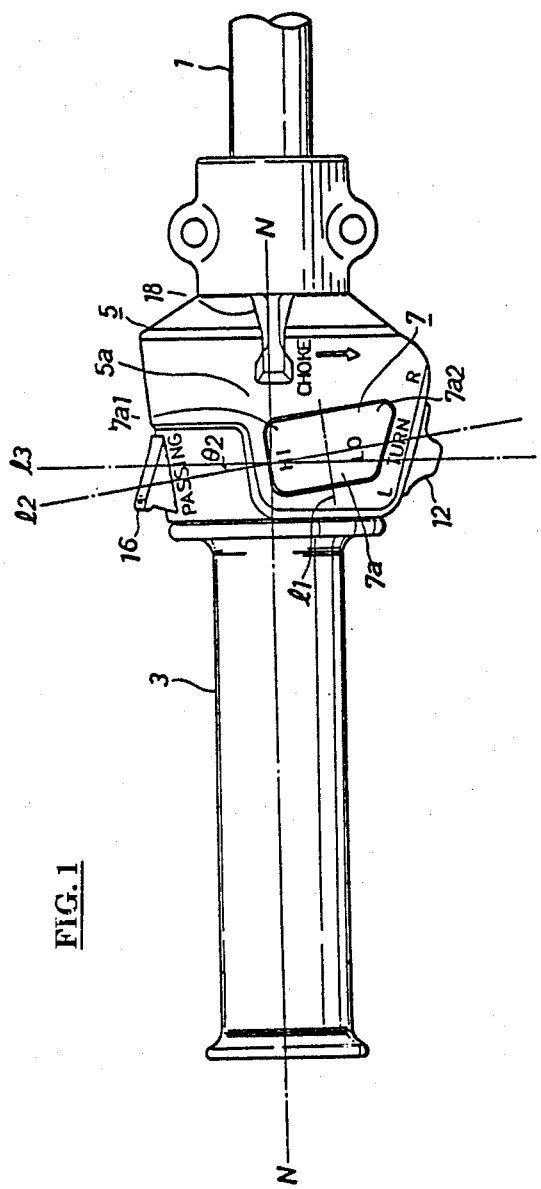
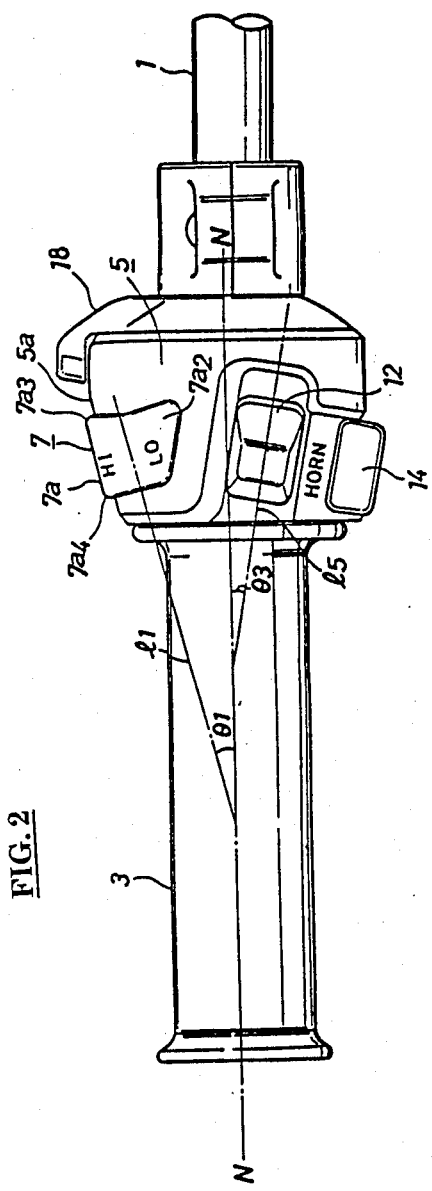
FIG. 1
FIG. 2

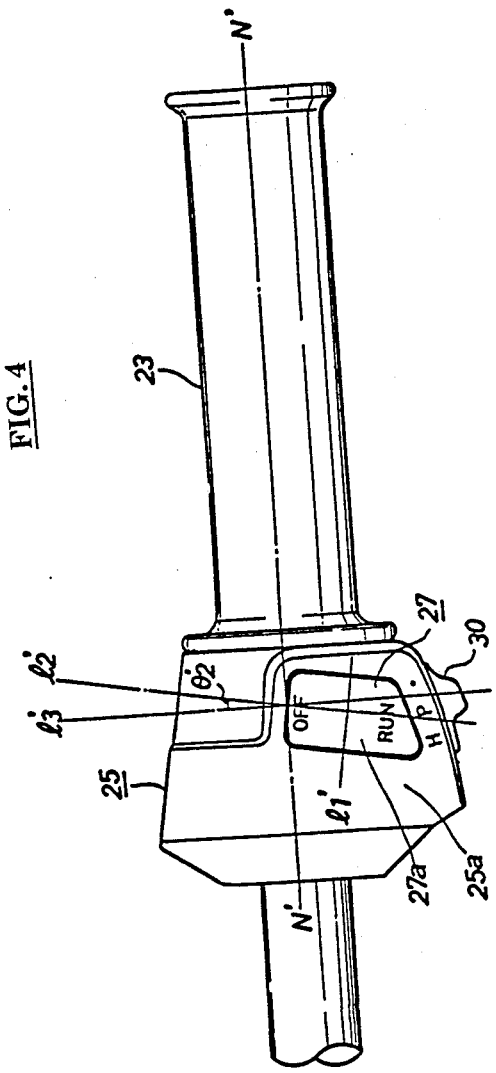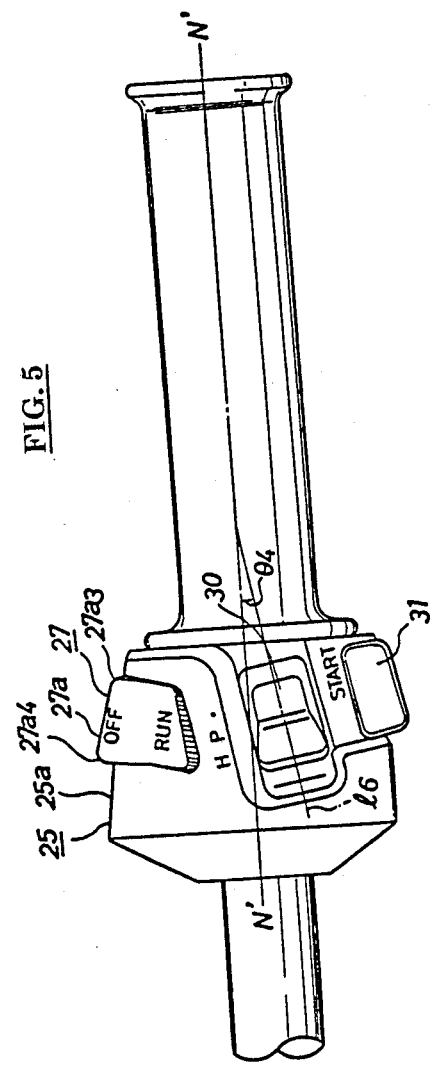

SWITCH DEVICE FOR MOTORCYCLE OR THE LIKE

GENERAL BACKGROUND AND SUMMARY OF INVENTION

This invention pertains to a switch device for a motorcycle or the like, where the vehicle involved has a handle grip fitted to one end of a handle bar, with a switch case being arranged on an inside end of the handle grip and with a switch knob being mounted on a mounting surface of the switch case. In this context, this invention is characterized in that a center line of the switch knob is arranged so as to be inclined or slanted relative to a line extending perpendicular to the longitudinal center line of the handle bar and so as to extend generally along arc-like trace or path described by the tip of a thumb of an operator's hand which grips the handle grip.

In a motorcycle or the like, a switch device is ordinarily constituted by a handle grip fitted on one end of a handle bar, a switch case arranged on an inside end of this handle grip, and a switch knob mounted on a mounting surface of the switch case.

In such a switch device, a switch mounted on the mounting surface is operated by a thumb or an index finger of an operator's hand. However, such a switch has needed improvement in its constitution and arrangement so as to more appropriately suit the movement of these hand digits, particularly the thumb, whereby its operability is reasonably improved from a standpoint of human engineering or ergonomics.

In the light of these circumstances, and need for improvement, it is an object of the present invention to provide a switch device which is improved in operability by uniquely supporting and orienting the switch and uniquely relating the switch to the digit tip movement arc of an operator.

In accomplishing these improvement objectives, this invention contemplates
a switch device for a motorcycle or the like having:
 a handle grip fitted to one end of a handle bar,
 a switch case arranged on an inside portion of an end of the handle grip, and
 a switch knob means mounted on a mounting surface of the switch case.

This switch device comprises support means operable to position the switch knob means with a center line thereof being inclined relative to a line extending perpendicular to a longitudinal axis of the handle bar.

This switch knob means further includes:
multiple operating locations operable to effect diverse operating conditions in response to depression by an operator's hand digit tip; with
the multiple operating locations being disposed generally along an arcuate path traversed by the operator's hand digit tip while the operator is hand-gripping the handle grip.

Further and independent improvement resides in subcombinations as hereinafter claimed, including a switch device combination as described above wherein the arcuate path transverses multiple operating locations of multiple switch knobs, which multiple operating locations are mutually, and at least partially, displaced longitudinally and laterally of each other in relation to a longitudinal axis of said handle grip.

Before describing this invention in detail, reference will now be made to appended drawings of presently preferred embodiments.

DRAWINGS

In describing this invention, by way of exampley only, and not by way of limitation, reference will be made to the appended drawings wherein:

FIG. 1 provides a top plan, fragmentary view of a handle bar/switch means of the present invention;

FIG. 2 provides a side elevation of the FIG. 1 arrangement;

FIG. 3 illustrates an operator's digit tip (in this case a thumb) traversing an arc along multiple actuation locations; and FIGS. 4 and 5 provide top plan and side elevational views of other handle bar/switch arrangements of this invention.

Before proceeding further with a detailed discussion of the presently preferred embodiments, attention is now called to certain major elements as follows:

| Element Numeral | Element |
|---|---|
| 1 | Handle bar |
| 3 | Handle grip |
| 5 | Switch case |
| 5a | Mounting surface |
| 7 | Switch knob, |
| 13 | Perpendicular line of the handle bar, i.e. line perpendicular to longitudinal axis N |
| 14 | Trace described by a finger tip of a thumb. |

DETAILED DESCRIPTION OF PREFERRED EMBODIMENTS

The Invention Broadly Explained

Figure 3:
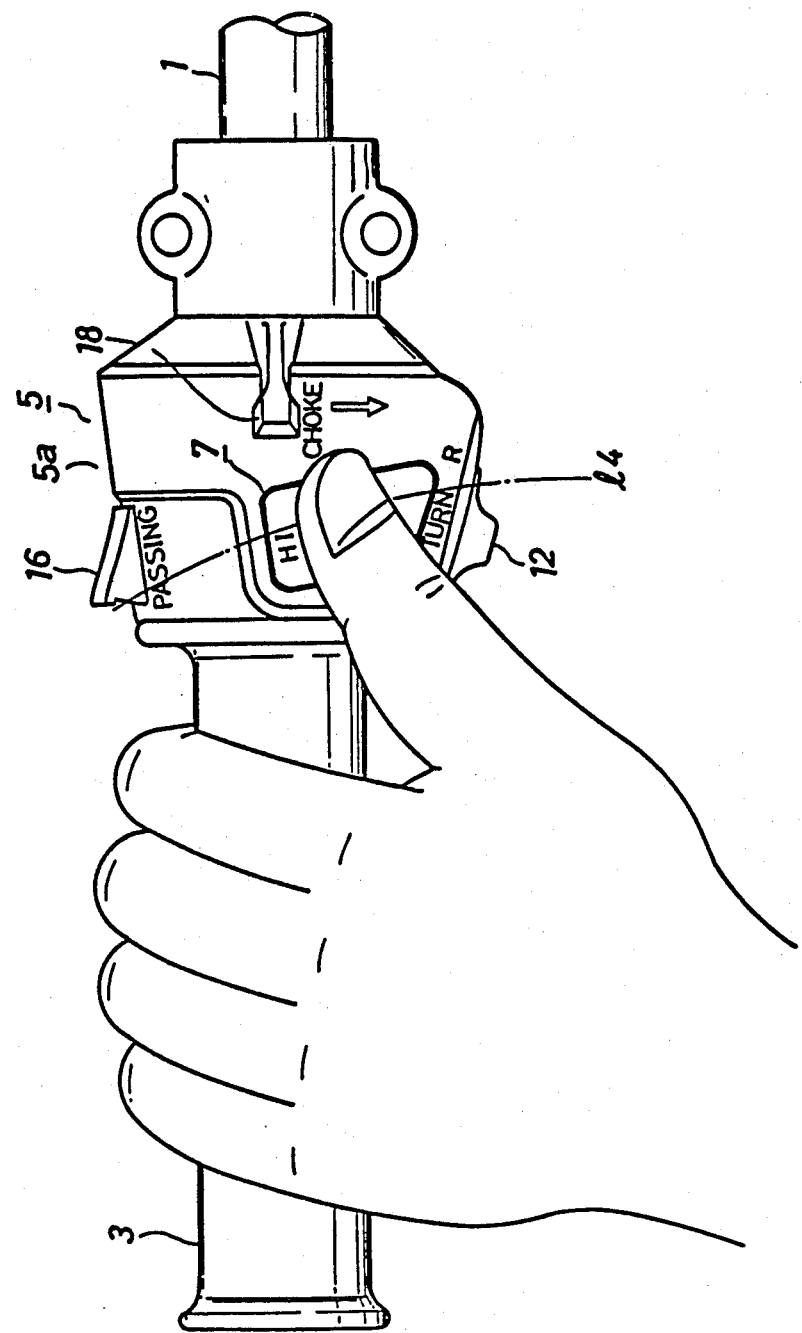

In order to attain the above stated objectives, the present invention provides a switch device for a motorcycle or the like having a handle grip 3 fitted to one end of a handle bar 1. A switch case 5 is arranged on an inner side of an end of the handle grip 3, with a beam changing switch 7 being mounted on a mounting surface 5a of the switch case 5. This invention is characterized in that a center line 11 of the beam changing switch 7 is arranged so as to be slanted or inclined relative to a perpendicular line 13 of the handle bar 1 so as to extend along a generally arc like trace or path 14 described by a finger tip of a thumb of an operator's hand gripping the handle grip 3.

Since the extending, inclined direction of the switch knob thus generally coincides with the trace described by the thumb, when the switch knob is operated, the thumb, while undergoing arcuate movement but without changing the hand grip, is able to depress different spaced actuation locations of the switch knob means.

Preferred Embodiments

The following description will be made with respect to presently preferred embodiments of the invention, with reference being made to accompanying drawings.

Attention is now called to FIG. 1 which shows a plan view of a switch device according to the present invention and FIG. 2 which shows a side elevation.

Reference numeral 1 shows a handle bar of a motorcycle or the like. The handle bar 1 is mounted, as is well known, through means of a handle bar bracket or the like. On both ends of the handle bar 1 are provided handle grips 3.

FIGS. 1 and 2 show a left side handle grip 3. This handle grip may be formed with a rubber sheath or the like which is easy to grip and which is slip resistant.

To an inside end of the handle grip 3 there is provided a switch case 5 which is secured around the handle bar 1.

As apparent from FIGS. 1 and 2, the switch case 5 provides a frusto-conical mounting surface 5a which is taperingly formed so as to gradually enlarge away from the handle bar 1 in a direction moving away from the outside end (left side in Figure) toward the inside end right side of FIG. 1).

On an upper surface side of the mounting surface 5a there is provided and arranged a beam changing switch 7 which provides laterally and longitudinally displaced high beam and a low beam actuation positions for a head light. This beam changing switch 7 is rockable about a swinging center line 11. If an upper side portion $7a_1$, of a pressing surface $7a$ is pressed toward the handle bar, the beam changing switch 7 rocks toward the outer side of the handle bar about the center line 11, whereby the head light is actuated to produce a high beam. Conversely, if a lower side portion $7a_2$ is pressed toward the handle bar, the beam changing switch 7 rocks toward the inner side of the handle bar about the swinging center line 11 whereby the head light changes to the low beam mode.

Also, as is shown in FIG. 2, this beam changing switch 7 is mounted so that the pressing surface $7a$ is substantially parallel to the frusto-conical mounting surface 5a. That is, the pressing surface $7a$ slants so as to separate further from the handle bar 1 at an inside portion $7a_3$, as compared to an outside portion $7a_4$. The beam changing switch 7 slants with an angle $\theta 1$ relative to an axis N—N of the handle bar. For this reason, the beam changing switch 7 feels better in a grip position when the thumb is placed on the pressing surface $7a$ of the beam changing switch 7.

Further, as is apparent from FIG. 1, this beam changing switch 7 is arranged so that the upper side portion $7a_1$ is displaced toward the outside grip end (left side in FIG. 1) and the lower side portion $7a_2$ is displaced toward the inside grip end (right side in Figure). That is, the center axis 12 of the beam changing switch 7 is adapted to slant with an angle $\theta 2$ relative to a perpendicular line 13 of the longitudinal axis N—N, of the handle bar. This means that the beam changing switch 7 as shown in FIG. 3 extends in a direction which substantially coincides with a trace 14 described by the finger tip of the thumb 10. When the beam changing switch 7 is rocked from the high beam side to the low beam side or from the low beam side to the high beam side, the direction in which the finger tip of the thumb 10 moves substantially coincides with the locations of the displaced actuating positions $7a_1$ and $7a_2$ of the beam changing switch 7. Accordingly, in the operation of the beam changing switch 7, the thumb 10 moves a natural direction, whereby it is possible to improve the ergonomic operability of the switch.

Also, this beam changing switch 7 is constituted so that the surface of the lower side portion $7a_2$ becomes coplanar with the mounting surface 5a at the lower beam condition, that is, at the condition in which the lower side portion $7a_2$ of the pressing surface $7a$ is being pressed. Thus, the condition (low beam or high beam) of the beam changing switch 7 can readily be discriminated without the driver actually looking at the beam changing switch 7.

Further, in the present embodiment, the beam changing switch 7 is taperingly arranged so that the upper side portion $7a_1$ is placed at the outside end (left end of drawings) and the lower side portion $7a_2$ at the inside (right end of drawings). However, in a case that the actuating locations of beam changing switch 7 are switched relative to the rocker axis, the beam changing switch 7 is taperingly arranged so that the hi-beam portion $7a_1$ may be positioned at the inside end of the grip and the portion $7a_2$ at the outside end. In short, the beam changing switch 7 is to be arranged so that the extending direction 12 of the beam changing switch 7 substantially coincides with a trace 14 described by the finger tip of the thumb 10.

As will now be appreciated, the arcuate path 14 traverses multiple operating location $7a_1$, $7a_2$ and 12 of multiple switches 7 and 12, which multiple operating locations are mutually, and at least partially, displaced longitudinally and laterally of each other in relation to the longitudinal axis N—N of the handle grip 3. The center line 2 of the beam changing switch 7 extends generally laterally and outwardly rearwardly of the hand bar 1. At least one of said switch knobs, i.e. 12, is arranged for sliding movement along an axis 15 inclined relative to the longitudinal axis N—N and substantially aligned with a path traversed by flexing movement of the operator's digit, i.e. thumb. The inclined axis of sliding movement of winker switch 12 extends downwardly and forwardly relative to the handle bar 1. The center line 2 of the beam changing switch 7 extends generally laterally and outwardly rearwardly of the handle bar 1.

Further, in FIGS. 1, 2, and 3, reference numeral 12 shows a winker switch which is slidable in left and right directions. The winker switch 12 is taperingly mounted on the mounting surface 5a so that a center axis 15 of the winker switch 12 has an angle $\theta 3$ relative to the handle axis N—N. By this means, a trace described by the flexing tip movement of the thumb upon the operation of the switch 12 substantially coincides with the center axis 15 of the winker switch 12, whereby the ergonomic operations of this switch can be improved.

Reference numeral 14 of FIG. 2 shows a push type horn switch, the axis of which is slanted at an angle relative to the axis of the handle bar 1, i.e. an axis angle somewhat mirror-image related to angle $\theta$-1. Also reference numeral 16 of FIG. 1 shows a passing switch which is operated by an index finger and reference numeral 18 shows a choke lever. The actuating locations of each of these switches 16 and 18 is closely aligned with arc 14.

FIGS. 4 and 5 show another switch case 25 provided on an inner end of a right side handle grip 23. A mounting surface 25a of the switch case 25 is taperingly formed in a frusto-conical form so that its inside end separates more from the handle bar 1 than its outside end.

A kill switch 27 is mounted on the mounting surface 25a so as to rock about a swinging center line 11'. A pressing surface of 27a of the kill switch 27 is generally parallel to the mounting surface 25a, that is, the inside portion $27a_4$ is slantly mounted to be separated more from the handle bar 1, as compared with the separation of the outside portion $27a_3$. Further, the center axis 12' of this kill switch 27 is arranged to slant for a required angle $\theta 2'$ relative to a perpendicular line $1_3'$ of axis N—N of the handle bar 1. That is, the line l₃ of the kill switch 27 extends so as to substantially coincide with the trace described by the finger tip of the thumb of the operator's hand gripping handle grip 23. The ergonomic function and effect of the kill switch is similar to that of the beam changing switch 7 of the left side, switch case 5.

Further, in FIG. 4, reference numeral 30 shows a slide-type dimmer switch which is mounted on the mounting surface 25a so that a center axis 16 slants with an angle $\theta$-4 to an axis N'—N' of a handle bar. This insures that the trace of the operator's thumb flexing during slide switch operation is generally aligned with axis 16. Reference numeral 31 also shows a starter button.

SUMMARY OF ADVANTAGES AND SCOPE OF INVENTION

According to the present embodiment as mentioned above, the beam changing switch 7, the kill switch 27, or the like, is arranged so that its center axis slants at a certain angle with respect to a line perpendicular to the longitudinal axis of the handle bar. In other words, these switches extend in the directions which substantially coincide with the traces described by the finger tips of the operator's thumbs. Accordingly, the thumbs move in a natural direction upon the operation of the associated switches whereby these switches can be ergonomically improved. This same philosophy applies to the slide switch arrangements described above, albeit with a different orientation axis arrangement.

As mentioned earlier, according to the present invention, the extending direction of a switch of this invention orientation substantially coincides with the trace described by the thumb. Thus, upon the operation of the switch knob, the thumb is led to move in a natural direction, whereby the switch device can be widely improved in its ease of operation.

Those skilled in the motorcycle switch control art and familiar with this disclosure will doubtless recognize that this invention is not limited to the illustrated and preferred embodiments and extends to alternative, reversal, equivalent, substitute, and modification arrangements encompassed by the scope of the appended claims.

What is claimed is:

1. A switch device for a motorcycle or the like having
  a handle grip fitted to one end of a handle bar,
  a switch case arranged on an inside portion of an end of said handle grip, and
  a switch knob means mounted on a mounting surface of said switch case;
said switch device comprising:
  multiple operating locations operable to effect diverse operating conditions in response to depression by an operator's hand digit tip;
  support means operable to concurrently
    position said switch knob means with a center line thereof being inclined relative to a line extending perpendicular to a longitudinal axis of said handle bar, and
    generally longitudinally displace said multiple operating locations along the longitudinal axes of said handle bar; and
  said multiple operating locations being disposed generally along an arcuate path transversed by said operator's hand digit tip while said operator is hand-gripping said handle grip.

2. A switch device as described in claim 1 wherein:
  said arcuate path transverses multiple operating locations of multiple switch knobs, which multiple operating locations are mutually, and at least partially, displaced longitudinally and laterally of each other in relation to a longitudinal axis of said handle grip.

3. A switch device for a motorcycle or the like having
  a handle grip fitted to one end of a handle bar,
  a switch case arranged on an inside portion of an end of said handle grip, and
  a switch knob means mounted on a mounting surface of said switch case;
said switch device comprising:
  multiple operating locations operable to effect diverse operating conditions in response to depression by an operator's hand digit tip;
  support means operable to concurrently
    position said switch knob means with a center line thereof being inclined relative to a line extending perpendicular to a longitudinal axis of said handle bar, and
    generally longitudinally displace said multiple operating locations along the longitudinal axes of said handle bar; and
  said multiple operating locations being disposed generally along an arcuate path transversed by said operator's hand digit tip while said operator is hand-gripping said handle grip, said arcuate path transversing multiple operating locations of multiple switch knobs, which multiple operating locations are mutually, and at least partially, displaced longitudinally and laterally of each other in relation to a longitudinal axis of said handle grip; and
  wherein said center line of said switch knob means extends generally laterally and outwardly rearwardly of said handle bar.

4. A switch device for a motorcycle or the like having
  a handle grip fitted to one end of a handle bar,
  a switch case arranged on an inside portion of an end of said handle grip, and
  a switch knob means mounted on a mounting surface of said switch case;
said switch device comprising:
  multiple operating locations operable to effect diverse operating conditions in response to depression by an operator's hand digit tip;
  support means operable to concurrently
    position said switch knob means with a center line thereof being inclined relative to a line extending perpendicular to a longitudinal axis of said handle bar, and
    generally longitudinally displace said multiple operating locations along the longitudinal axes of said handle bar; and
  said multiple operating locations being disposed generally along an arcuate path transversed by said operator's hand digit tip while said operator is hand-gripping said handle grip, said arcuate path transversing multiple operating locations of multiple switch knobs, which multiple operating locations are mutually, and at least partially, displaced longitudinally and laterally of each other in relation to a longitudinal axis of said handle grip; and wherein at least one of said switch knobs is arranged for sliding movement along an axis inclined relative to said longitudinal axis and substantially aligned with a path traversed by flexing movement of said operator's digit.

5. A switch device for a motorcycle or the like having
a handle grip fitted to one end of a handle bar,
a switch case arranged on an inside portion of an end of said handle grip, and
a switch knob means mounted on a mounting surface of said switch case;
said switch device comprising:
multiple operating locations operable to effect diverse operating conditions in response to depression by an operator's hand digit tip;
support means operable to concurrently position said switch knob means with a center line thereof being inclined relative to a line extending perpendicular to a longitudinal axis of said handle bar, and
generally longitudinally displace said multiple operating locations along the longitudinal axes of said handle bar; and
said multiple operating locations being disposed generally along an arcuate path transversed by said operator's hand digit tip while said operator is hand-gripping said handle grip; said center line of said switch knob means extending generally laterally and outwardly rearwardly of said handle bar; and
wherein said inclined axis of sliding movement of said at least one of said switch knobs extends downwardly and forwardly relative to said handle bar.

* * * * *